United States Patent [19]

D'Amico et al.

[11] Patent Number: 5,542,966
[45] Date of Patent: Aug. 6, 1996

[54] HELIUM RECOVERY

[75] Inventors: Joseph S. D'Amico, Linthicum; Herbert E. Reinhold, III, Annapolis, both of Md.; Kent S. Knaebel, Plain City, Ohio

[73] Assignee: Nitrotec Corporation, New York, N.Y.

[21] Appl. No.: 326,917

[22] Filed: Oct. 21, 1994

[51] Int. Cl.$^6$ ............................................. B01D 53/047
[52] U.S. Cl. ............................ 95/101; 95/103; 95/105; 95/130; 95/143
[58] Field of Search ............................ 95/98, 100–105, 95/143–148

[56] References Cited

U.S. PATENT DOCUMENTS

| | | | |
|---|---|---|---|
| 3,636,679 | 1/1972 | Batta | 95/103 X |
| 3,683,589 | 8/1972 | Seitz et al. | 55/62 |
| 3,797,201 | 3/1974 | Tamura | 95/105 |
| 3,838,553 | 10/1974 | Doherty | 95/98 |
| 4,077,780 | 3/1978 | Doshi | 95/100 |
| 4,171,207 | 10/1979 | Sircar | 95/101 |
| 4,444,572 | 4/1984 | Avon et al. | 55/26 |
| 4,529,412 | 7/1985 | Hayashi et al. | 55/25 |
| 4,539,020 | 9/1985 | Sakuraya et al. | 55/26 |
| 4,581,044 | 4/1986 | Uno et al. | 55/25 |
| 4,661,125 | 4/1987 | Haruna et al. | 95/102 |
| 4,705,541 | 11/1987 | Sircar et al. | 55/26 |
| 4,711,645 | 12/1987 | Kumar | 55/26 |
| 4,732,577 | 3/1988 | Koizumi et al. | 95/101 |
| 4,770,676 | 9/1988 | Sircar et al. | 55/26 |
| 4,790,858 | 12/1988 | Sircar | 55/26 |
| 4,813,977 | 3/1989 | Kumar et al. | 55/26 |
| 4,813,980 | 3/1989 | Sircar | 55/26 |
| 4,869,894 | 9/1989 | Wang et al. | 95/101 X |
| 4,892,565 | 1/1990 | Kumar et al. | 55/26 |
| 4,913,709 | 4/1990 | Kumar | 55/26 |
| 4,914,218 | 4/1990 | Kumar et al. | 95/100 |
| 4,915,711 | 4/1990 | Kumar | 55/26 |
| 5,013,334 | 5/1991 | Maurer | 55/26 |
| 5,080,694 | 1/1992 | Knoblauch et al. | 95/101 X |
| 5,089,048 | 2/1992 | Knoblauch et al. | 95/101 X |
| 5,089,565 | 3/1992 | Knoblauch et al. | 55/26 |
| 5,112,590 | 5/1992 | Krishnamurthy et al. | 95/102 X |
| 5,171,333 | 12/1992 | Mauren | 55/26 |
| 5,174,796 | 12/1992 | Davis et al. | 55/26 |
| 5,224,507 | 7/1993 | Mehra | 62/17 |
| 5,234,472 | 8/1993 | Krishnamurthy et al. | 95/98 |
| 5,382,280 | 1/1995 | Choe et al. | 95/105 X |

FOREIGN PATENT DOCUMENTS

| | | |
|---|---|---|
| 071553 | 7/1982 | European Pat. Off. . |
| 092695 | 4/1983 | European Pat. Off. . |
| 394947 | 10/1990 | European Pat. Off. . |
| WO8809306 | 5/1988 | WIPO . |

OTHER PUBLICATIONS

C. Tannehill et al; Nitrogen Removal Costs Vary by Concentration; American Oil & Gas Reporter; May 1994.

R. J. Buras et al; Nitrogen Rejection and Pressure Swing Adsorption; Principles, Design, and Remote Control using an Expert System; Univ. of Oklahoma Conference–Feb. 28, 1994.

Methane/Nitrogen Gas Separation over the Zeolite Clinoptolite by the Selective Adsorption of Nitrogen Industrial Gas Separations, 1983 Am.Chem Society Frankiewicz et al.

A Study of Heatless Adsorption on the System $CO_2$ in the He(I) Chem Eng. Science 1972, vol. 27 pp. 1449–1458 Schendalman et al.

Study of Heatless Adsorption in the Model System $CO_2$ in He(II) Aiche Symposium Series No. 134, vol. 69 1973; Mitchell et al.

Recovery and Purification of Light Gases by PSA Cheng et al. ACS Symposium Series #223, Industrial Gas Separations, 1983.

The Optimal Control of a Periodic Adsorber Aiche Journal, vol. 18, No. 6 Nov. 1972; Kowler et al.

Separation of Nitrogen and Methane via Peniodic Adsorption Aiche Journal, vol. 17, #2, Mar. 1971; Turnock et al.

Separation of Helium–Methane Mixtures by PSA Aiche Journal, vol. 31, #1 Jan. 1985; Cheng et al.

Kinetic Separation by Pressure Swing Adsorption; Method & Model Aiche Jounal, vol. 36, No. 8, Aug. 1990; Ackley et al.

Separation of Nitrogen From Helium Using PSA; Bind et al Advanced Cryobenic Engineering, No. 19 pp. 463–473 1973.

A New Composite Sorbent for Methane–Nitrogen Separated by Adsorption; Separation Science and Technology, No. 257 (7 & 8) 845–868, 1990; Baksh et al.

Primary Examiner—Robert Spitzer
Attorney, Agent, or Firm—Michael J. McGreal

[57] ABSTRACT

The disclosed pressure swing adsorption processes can recover helium from source streams of less than about 10 percent by volume helium and concentrate the helium to a concentration of greater than about 98 percent by volume. Two stages of pressure swing adsorption are used in series. The source of the helium gas will be natural gas wells. The source gas will contain hydrocarbons but in most instances the primary gas other than helium will be nitrogen. Each stage of pressure swing adsorption will contain a plurality of adsorbent beds, and preferably about four. In each stage the adsorbent beds will be cycled through multiple phases. In the first stage the adsorbent beds will sequentially undergo the phases of adsorption, recycle, depressurization, evacuation, helium pressurization and recycle feed pressurization. The product gas from the first stage is flowed to the second stage and in the second stage sequentially will undergo the phases of adsorption, depressurization, evacuation, purge, and helium pressurization. The offgas from evacuation and purge in the second stage is flowed to input to the first stage. The processes using an adsorbent that adsorbs the gases other than helium produces a product stream in a high volume with a helium content of more than 98 percent by volume.

20 Claims, 6 Drawing Sheets

STAGE I PHASE SEQUENCES

| TIME / ADSORBENT BED | 0 - 120 SECONDS | 120 - 240 SECONDS | 240 - 360 SECONDS | 360 - 480 SECONDS |
|---|---|---|---|---|
| ADSORBENT BED A | ADSORPTION (1) + RECYCLE (2) | DEPRESSURIZATION | EVACUATION | HE PRESSURIZATION (3) + RECYCLE FEED PRESSURIZATION (4) |
| ADSORBENT BED B | HE PRESSURIZATION (3) + RECYCLE FEED PRESSURIZATION (4) | ADSORPTION (1) + RECYCLE (2) | DEPRESSURIZATION | EVACUATION |
| ADSORBENT BED C | EVACUATION | HE PRESSURIZATION (3) + RECYCLE FEED PRESSURIZATION (4) | ADSORPTION (1) + RECYCLE (2) | DEPRESSURIZATION |
| ADSORBENT BED D | DEPRESSURIZATION | EVACUATION | HE PRESSURIZATION (3) + RECYCLE FEED PRESSURIZATION (4) | ADSORPTION (1) + RECYCLE (2) |

(1) ADSORPTION 40 SECONDS.
(2) RECYCLE 80 SECONDS
(3) HELIUM PRESSURIZATION 40 SECONDS
(4) RECYCLE PRESSURIZATION 80 SECONDS (40 SECONDS IF THERE IS FEED PRESSURIZATION)

FIG. 5

STAGE II PHASE SEQUENCES

| TIME / ADSORBENT BED | 0 - 90 SECONDS | 90 - 180 SECONDS | 180 - 270 SECONDS | 270 - 360 SECONDS |
|---|---|---|---|---|
| ADSORBENT BED E | ADSORPTION | DEPRESSURIZATION | EVACUATION + PURGE (1) | HELIUM PRESSURIZATION (2) |
| ADSORBENT BED F | HELIUM PRESSURIZATION (2) | ADSORPTION | DEPRESSURIZATION | EVACUATION + PURGE (1) |
| ADSORBENT BED G | EVACUATION + PURGE (1) | HELIUM PRESSURIZATION (2) | ADSORPTION | DEPRESSURIZATION |
| ADSORBENT BED H | DEPRESSURIZATION | EVACUATION + PURGE (1) | HELIUM PRESSURIZATION (2) | ADSORPTION |

(1) 15 SECONDS PURGE
(2) OPTIONAL 15 SECONDS FEED GAS PRESSURIZATION

FIG. 6

HELIUM RECOVERY

FIELD OF THE INVENTION

This invention relates to processes for the recovery of helium from a natural gas containing stream. More particularly, this invention relates to a pressure swing adsorption system for the recovery of helium from a natural gas containing stream.

BACKGROUND OF THE INVENTION

The principal source of helium is its separation from natural gas streams prior to the natural gas streams being used as a fuel or as a feedstock. Natural gas streams can contain up to about 10 percent helium. It is economically feasible to recover helium from a natural gas stream down to a content of about 0.1 percent.

A conventional way to recover helium from natural gas is to use a cryogenic process. Water, carbon dioxide and any sulfide gases are first removed by scrubbing with monoethanolamine and diethylene glycol. The gas stream is then flowed through a low temperature heat exchanger and the heavy hydrocarbon fraction is separated and recovered. Free of heavy hydrocarbons, the gas stream is reduced in temperature to about 116° K. This liquefies the remaining hydrocarbons which are removed. The resulting crude helium is then reduced in temperature to about 77° K. to remove any remaining traces of hydrocarbons and to produce a helium stream, containing small amounts of nitrogen, argon, neon and hydrogen. The helium stream is pressurized to 17.3 MPa at 77° K. and nitrogen and argon are separated. The remaining neon and hydrogen are removed by an activated carbon adsorbent.

Helium also can be separated from a helium and other gas containing stream by means of pressure swing adsorption. Such a process is disclosed in U.S. Pat. No. 5,089,048. This patent discloses a pressure swing adsorption system for helium enrichment. The process in this patent can be used with helium streams which contain less than 10 percent helium. The process consists of a three step pressure build-up phase, an adsorption phase, a three step pressure relief phase, and an evacuation phase. In the pressure build-up phase, a cocurrent first depressurization gas is flowed cocurrently into an adsorbent bed which has been evacuated to increase the gas pressure in this bed. This is followed by a countercurrent flow of a second countercurrent depressurization gas from another adsorbent bed which has completed an adsorption phase. This is then followed by a countercurrent flow of product gas to bring the bed up to the operating pressure. This process will produce a purified helium stream but at a lower efficiency. One problem is that there is a loss of product helium in the gases that are discharged as waste gases. Since the amounts of helium in the waste gas are relatively high, their loss creates an inefficiency in the process. In the processes of the present invention, helium is maintained in the pressure swing adsorption system as a gas inventory and not removed as part of a waste gas or off-gas. In addition the multi-step pressurization and depressurization techniques are not used.

European Patent 092,695 and U.S. Pat. No. 3,636,679 also disclose pressure swing adsorption systems for helium purification. In European Patent 092,695, the feed gas should contain about 50 to 95 percent by volume helium. It is not suitable for gas streams containing less than about 50 percent helium, and is clearly not useful where the helium content of the gas stream is less than about 25 percent helium.

These pressure swing adsorption processes do not economically produce a helium product having a purity of greater than 98 percent from a feed stream containing less than 10 percent helium.

BRIEF SUMMARY OF THE INVENTION

It is an object of this invention to enrich helium from a source stream containing less than about 10 percent helium to greater than about 98 percent helium. Cryogenic processes have the disadvantage of having a high capital cost and a high operating cost. However an enriched helium gas in a purity of more than about 98 percent can be produced by a two stage pressure swing adsorption process. The first pressure swing adsorption stage raises the helium content in the gas stream from less than about 10 percent to more than about 75 percent and the second pressure swing adsorption stage raises the helium content to more than about 98 percent.

Each stage of pressure swing adsorption also can be used alone without the other stage. The first stage of pressure swing adsorption can be used where a helium gas in a purity of 75 to 95 percent by volume will be sufficient. Such a purity is sufficient for party balloons and advertising balloons. The second stage of pressure swing adsorption can be used alone where the helium gas has been concentrated to about 50 to 90 percent by volume using a membrane or cryogenic technique but then must be increased to a purity of 98 percent by volume or more. This second stage of pressure swing adsorption is very efficient in producing high purity helium gas streams.

The first pressure swing adsorption stage is comprised of a plurality of adsorbent beds with each adsorbent bed sequentially undergoing six pressure swing adsorption phases. These are:

| I | Adsorption |
| II | Recycle |
| III | Depressurization |
| IV | Evacuation |
| V | Helium Pressurization |
| VI | Recycle Feed Pressurization |

The second pressure swing adsorption stage is comprised of a plurality of adsorbent beds with each adsorbent bed undergoing five phases. These are:

| I | Adsorption |
| II | Depressurization |
| III | Evacuation |
| IV | Purge |
| V | Helium Pressurization |

In the first stage pressure swing adsorption system the adsorbent bed enters a phase I adsorption phase and produces a crude helium product. Following the adsorption phase the adsorbent bed is regenerated. In regeneration the adsorbent bed first enters a phase II recycle phase where a recycle feed gas is produced. This is produced by feeding a part of the depressurization gas flowing countercurrently from another adsorbent bed which is on a phase III depressurization phase to this adsorbent bed. The recycle feed gas as it exits the adsorbent bed which has just completed an adsorption phase is flowed to an adsorbent bed about to go onto a phase I adsorption phase. In the phase II recycle phase the depressurization gas flows through the adsorbent bed pushing the gas in the void space (which has approximately feed gas composition) to the exit of the bed. The phase III depressurization comprises countercurrently reducing the pressure in the adsorbent bed, recovering a depressurization gas that is used in phase II recycle as described above, and the disposing of the remainder of the depressurization gas. At this point, the adsorbent bed undergoing phase III depressurization is at about ambient pressure and undergoes a phase IV evacuation phase to remove the adsorbed components. The adsorbent bed on phase IV evacuation is lowered in pressure to less than ambient pressure to countercurrently remove the adsorbed substances from the adsorbent bed. This gas can be recovered or vented depending on the commercial need for the gas. This gas primarily will be nitrogen and hydrocarbons. The adsorbent bed then undergoes a phase V helium pressurization where an enriched helium gas from phase I adsorption is flowed countercurrently into the adsorbent bed. In a final phase the adsorbent undergoes a phase VI recycle feed pressurization where recycle feed gas from phase II recycle is fed cocurrently into the adsorbent bed. The adsorbent bed then is at about input gas pressure and is in a condition for a phase I adsorption.

The crude helium from the first pressure swing adsorption stage is fed to the second pressure swing adsorption stage. In the second pressure swing adsorption stage the adsorbent bed on phase I adsorption receives the enriched helium product from the first pressure swing adsorption phase. Upon the completion of the phase I adsorption phase, the adsorbent bed undergoes a phase II depressurization phase. This consists of countercurrently reducing the pressure in the adsorbent bed to about ambient pressure. All of the depressurization gas produced in the depressurization phase is flowed to the adsorbent bed on an adsorption phase. Upon the completion of the phase II depressurization phase, the adsorbent bed then undergoes a phase III evacuation phase. This consists of reducing the pressure to less than ambient pressure. The off-gas from this phase can be collected and flowed to the feed of the first stage or vented. It will be nitrogen and with a very small amount of helium. Prior to completion of the evacuation phase, the adsorbent bed is purged with an amount of helium product from this second pressure swing adsorption stage. This consists of flowing some of the product helium gas countercurrently into the adsorbent bed. This removes traces of non-helium gases from the adsorbent bed and void space. The adsorbent bed then undergoes helium pressurization phase V which consists of flowing product helium gas countercurrently into the adsorbent bed. At this point the adsorbent bed has been regenerated and is ready for another adsorption phase.

Each pressure swing adsorption system is comprised of a plurality of adsorbent beds. Usually there are about three to five adsorbent beds in each pressure swing adsorption stage and preferably four. Each adsorbent bed in each stage sequentially will undergo the noted phases. The number of adsorbent beds used will be an economic balance between the capital cost of the installation and operating costs. The timing of the phase in each stage will to a degree be dependent on the composition of the feed streams, the feed stream flow rates and the size of the adsorbent beds.

BRIEF DESCRIPTION OF THE DRAWINGS

FIG. 5 is a table which sets out the phase sequences by time for the first stage pressure swing adsorption system.

FIG. 6 is a table which sets out the phase sequences by time for the second stage pressure swing adsorption system.

DETAILED DESCRIPTION OF THE INVENTION

The present processes will be described in more detail with reference to the figures. The processes consist of two stages of pressure swing adsorption. In the first stage, a gas stream which contains from about 0.1 to 10 percent by volume helium is enriched in helium to more than about 75 percent by volume, and preferably to more than about 90 percent by volume helium. This is accomplished by preferentially adsorbing the other gases that are present along with the helium and removing the other gases. Then in a second stage of pressure swing adsorption, depending on the helium content of the feed gas, the helium content of the gas stream is increased to more than 95 percent by volume, and preferably to more than about 99 percent. At this concentration the helium is commercially usable.

A primary source of helium is from natural gas wells. There are many natural gas wells that no longer produce natural gas with a hydrocarbon content to be useful as a fuel. However, many of these wells can produce a gas that contains from 0.1 to 10 percent by volume helium. The present process is economic to operate to recover this helium even though the other gases which make up the gas stream may not be used commercially.

Essentially any adsorbent that has an affinity for nitrogen and hydrocarbons can be used. The preferred adsorbents are activated carbons. The activated carbon can be derived from coal, wood, coconut or petroleum sources. Activated carbons that are suitable have a carbon tetrachloride number of about 60, a surface area of about 1,150 sq. meters/gram, a density of about 0.45 g./cc. and an average particle diameter of about 3 mm to 5 mm and preferably about 4 mm. Aluminosilicate and silica gel adsorbents also can be used.

Figure 1:
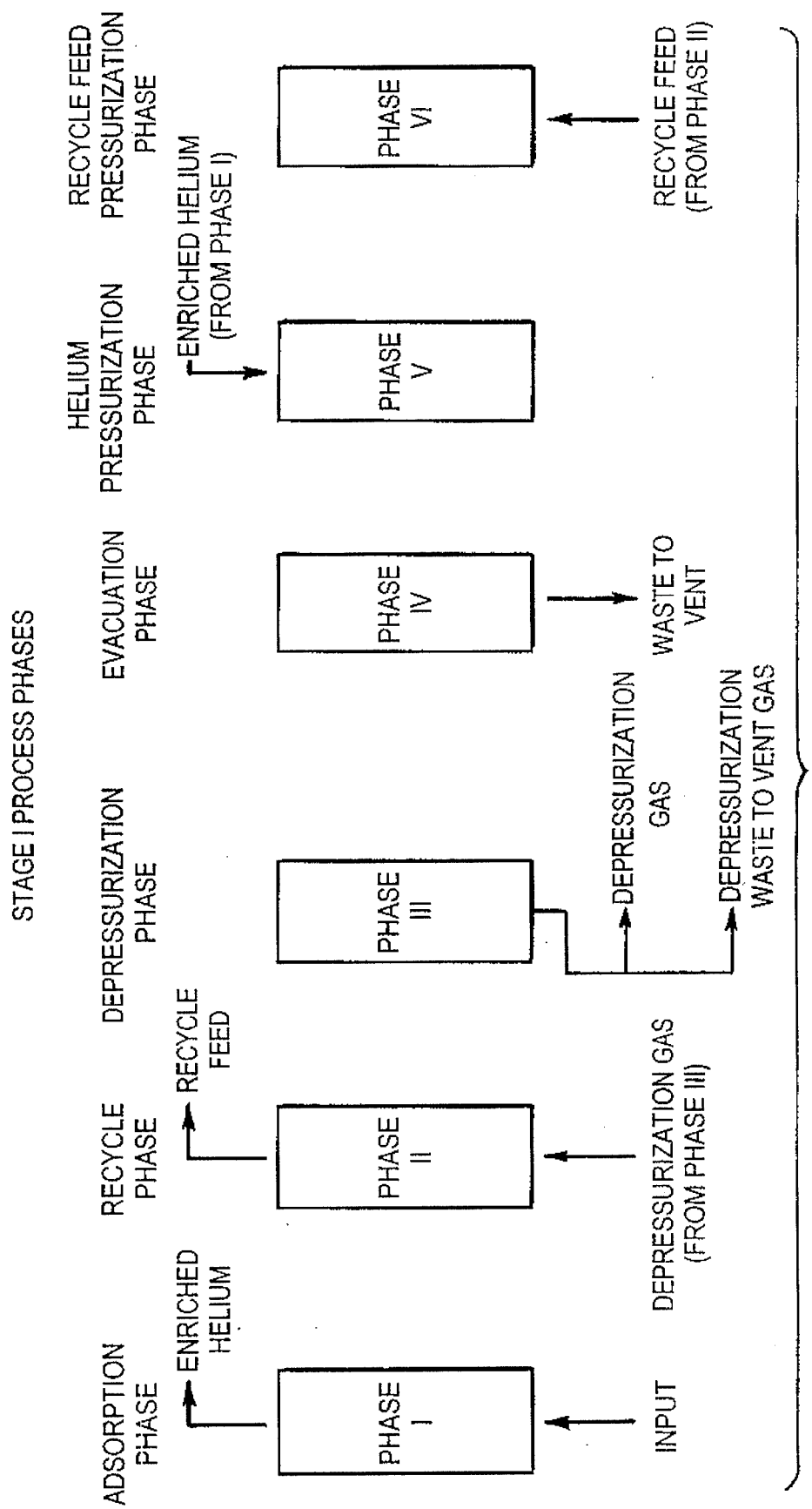
FIG. 1 is a schematic diagram of the pressure swing adsorption phases of the first stage of the helium recovery process.

The first pressure swing adsorption stage consists of six phases which are set out diagramatically in FIG. 1. In phase I, adsorption, an input gas stream is fed to the adsorbent bed. An enriched helium gas flows from this adsorbent bed with substantial quantities of the other gases being adsorbed in the adsorbent bed. A portion of the enriched helium is used in phase V helium pressurization. After the adsorbent bed that is undergoing adsorption has become saturated with adsorbed other gases, it enters recycle phase. This consists of flowing a depressurization gas from an adsorbent bed on a phase III depressurization to this adsorbent bed on phase II recycle after compressing this depressurization gas to about the input gas stream pressure or higher. This depressurization gas removes helium that is in the void space in the adsorbent bed to produce a recycle feed gas. The recycle feed gas with the helium from the void space flows from this adsorbent bed and is fed to the adsorbent bed that is on a phase VI recycle feed pressurization phase.

Concurrently an adsorbent bed is undergoing a phase III depressurization phase. The phase III depressurization phase consists of decreasing the pressure in an adsorbent bed to about ambient pressure. The first effluent gases from the adsorbent bed are the recycle gas stream. The second effluent gases are the other gases which usually are vented since they contain little or no helium. At the same time another adsorbent bed is undergoing a phase IV evacuation phase. The phase IV evacuation consists of drawing a vacuum on the adsorbent bed and countercurrently removing substantially all of the adsorbed gases from the adsorbent bed. These gases usually are flared, vented or recovered.

Simultaneously another adsorbent bed is undergoing a helium pressurization phase. In this phase enriched helium product from phase I adsorption is flowed into the adsorbent bed, preferably countercurrently. Immediately upon the completion of helium pressurization the adsorbent bed is further pressurized with recycle feed gas from phase II recycle. Preferably this gas is flowed cocurrently into the adsorbent bed. This adsorbent bed then will be at about the pressure of the input gas.

The enriched helium gas from phase I that is not used in the stage I pressure swing adsorption process is flowed to the second stage pressure swing adsorption process for additional enriching. The second stage pressure swing adsorption process is described in FIG. 2. This is a five phase process and is different from the first stage pressure swing adsorption process. The first phase of the second stage process is an adsorption phase and consists of passing the enriched helium gas from stage I into the adsorbent bed undergoing a second stage adsorption phase. A further enriched helium gas flows from the adsorbent bed on phase I adsorption with the non-helium other gases being adsorbed. A portion of this enriched helium is used in the phase IV purge phase to countercurrently flow and purge the other gases from the void space and the adsorbent in the bed undergoing this phase. Another portion of the enriched helium is flowed to phase V helium pressurization. The adsorbent bed undergoing phase V pressurization is pressurized prior to undergoing a phase I adsorption phase.

Concurrently, there is an adsorbent bed undergoing a phase II depressurization. This consists of countercurrently depressurizing the adsorbent bed which has completed the phase I adsorption phase to produce a recycle gas. The recycle gas from this phase II depressurization is pressurized to about the feed gas pressure or higher and flowed along with feed gas into the adsorbent bed on phase I adsorption.

At the same time, an adsorbent bed is undergoing a phase III evacuation. This consists of reducing the pressure from ambient to more than 20 inches of Hg vacuum, and preferably to more than about 28 inches of Hg vacuum. This removes substantially all of the other non-helium gases from the adsorbent bed. This gas from the evacuation phase is usually recycled to stage I input gas since it can contain up to 50 percent or more by volume helium.

These are the pressure swing adsorption phases that are used in stage I and in stage II. Each adsorbent bed undergoing the pressure swing adsorption process in each stage sequentially goes through the respective phases for stage I and for stage II. The timing for the phases in each stage varies with the composition of the input gas stream, gas flow rates and the size of the adsorbent beds. The timing will be governed also by the time that it takes an adsorbent bed on an adsorption phase to reach breakthrough. The input to the adsorbent bed on an adsorption phase will cease just prior to the adsorbed gases exiting (breaking through) the end of the adsorbent bed. This then will govern the timing of the other phases.

The stage I process will be described with particular reference to FIG. 3. The input gas stream is fed through conduit 10 and valve 12 into conduit 14 which delivers the input gas stream to the adsorbent beds. Since adsorbent bed A is on an adsorption phase inlet valve 32 is open as is exit valve 38. Valves 30, 34 and 36 are closed as are inlet valves 44, 56 and 68 for the other adsorbent beds. Valve 24 also is closed. An enriched helium product exits adsorbent bed A and flows through conduits 21 and 23 to stage II. Throttle valve 28 controls the pressure in conduits 21 and 23 and enriched helium storage tank 26 which stores some of the enriched helium product from this stage I. The stored enriched helium gas is used in stage I.

Upon the completion of the adsorption phase, adsorbent bed A enters a recycle phase. In the recycle phase, part of the depressurization gas flowing countercurrently from adsorbent bed D which is undergoing phase III depressurization and depressurization gas from storage tank 25 is fed to adsorbent bed A from conduit 22. During this time valve 32 is closed and valve 30 is opened. On the exit end of adsorbent bed A valve 38 is closed and valve 40 is open. A recycle feed gas flows from adsorbent bed A through conduit 20 to storage tank 16 during this phase. This recycle feed gas will be used to pressurize adsorbent bed B which concurrently is undergoing a phase VI recycle feed pressurization. In order to flow this gas to adsorbent bed B valve 12 is closed and valve 24 opened. Input valves 32, 68 and 56 on the other adsorbent beds are closed and valve 44 opened. The depressurization gas during the recycle phase removes a helium gas having a helium content of about the input gas from the void space in adsorbent bed A.

While adsorbent bed A is on an adsorption phase and a recycle phase, adsorbent bed D has been on a phase III depressurization phase. In this phase, outlet valves 74 and 76 are closed as are inlet valves 66, 68 and 72. Depressurization gas flows from adsorbent bed D through valve 70 and into conduit 18. This depressurization gas is compressed in compressor 29 to about input gas pressure and fed to adsorbent bed A which has entered into a recycle phase. Some of the compressed depressurization gas is stored in receiver tank 25. Once all of the helium is flushed from adsorbent bed A in the recycle phase, the remaining depressurization gas flowing from adsorbent bed D can be vented through conduit 31 and valve 78.

While adsorbent bed A is on an adsorption phase and a recycle phase, and adsorbent bed D on a depressurization phase, adsorbent bed C is on a phase IV evacuation phase. In this phase outlet valves 62 and 64 and inlet valves 54, 56 and 58 of adsorbent bed C are closed. Valve 60 is opened. Evacuation gas, which is substantially the more highly adsorbed non-helium gases, flows through conduit 11 to vacuum pump 35 and is vented or otherwise used. Upon the completion of the evacuation phase, adsorbent bed C is substantially unloaded of the non-helium more highly adsorbed gases.

Concurrently with these operations, adsorbent bed B has been on repressurization. The first part of repressurization consists of the phase V helium pressurization phase. In this phase, all of the inlet valves to adsorbent bed B, valves 42, 44, 46 and 48, are closed. Outlet valve 52 also is closed. However, outlet valve 50 is opened so that enriched helium gas will flow countercurrently into adsorbent bed B. Upon the completion of helium pressurization, valve 50 is closed and inlet valve 44 is opened. At this time inlet valve 12 is closed and recycle valve 24 is opened. This allows a recycle feed gas to flow into adsorbent bed B through conduit 14 from storage tank 16. This will repressurize adsorbent bed B to about the input feed gas pressure.

A preferred option is to incorporate a short input gas repressurization just prior to the adsorption phase. In this mode up to about half of the recycle feed repressurization time is transferred to an input gas repressurization time. In this preferred option it only is required that valve 24 be closed and valve 12 opened. Since adsorbent bed B will be entering an adsorption phase in the next sequence, this will remain the position of these valves. During an input gas pressurization of adsorbent bed B outlet valves 50 and 52 remain closed. When adsorbent bed B enters the adsorption phase it then will be necessary only to open valve 50.

This describes a full sequence of the operation of the stage I pressure swing adsorption system. This produces an enriched helium which contains more than about 75 volume percent helium, and preferably more than about 90 volume percent helium. The adsorbent beds then sequentially go through the phase sequences as set out in FIG. 5. A useful timing for a full cycle is 480 seconds. However, timing is dependent on input gas stream composition, pressure and flow rates as well as adsorbent bed size. If a feed pressurization step is used in the repressurization of the adsorbent beds this usually will be for a period of about 40 seconds. This timing is for adsorbent beds which contain about 18,000 pounds of adsorbent, a feed gas pressure of about 50 psia and a flow rate of about 1000 to 3000 cubic feet per minute, and preferably about 2000 cubic feet per minute. Table 1 gives the valve position versus time during a cycle of the stage I pressure swing adsorption system. The full operation of the stage I process is fully described with reference to FIG. 3, FIG. 5 and Table 1.

TABLE 1

| Valve # | 0–120 sec. | 120–240 sec. | 240–360 sec. | 360–480 sec. |
|---|---|---|---|---|
| 12 | O/C[1] | O/C[1] | O/C[1] | O/C[1] |
| 24 | C/O[2] | C/O[2] | C/O[2] | C/O[2] |
| 30 | C/O[4] | C | C | C |
| 32 | O/C[3] | C | C | C/O[5] |
| 34 | C | O | C | C |
| 36 | C | C | O | C |
| 38 | O/C[3] | C | C | O/C[6] |
| 40 | C/O[4] | C | C | C |
| 42 | C | C/O[4] | C | C |
| 44 | C/O[5] | O/C[3] | C | C |
| 46 | C | C | O | C |
| 48 | C | C | C | O |
| 50 | O/C[6] | O/C[3] | C | C |
| 52 | C | C/O[4] | C | C |
| 54 | C | C | C/O[4] | C |
| 56 | C | C/O[5] | O/C[3] | C |
| 58 | C | C | C | O |
| 60 | O | C | C | C |
| 62 | C | O/C[6] | O/C[3] | C |
| 64 | C | C | C/O[4] | C |
| 66 | C | C | C | C/O[4] |
| 68 | C | C | C/O[5] | O/C[3] |
| 70 | O | C | C | C |
| 72 | C | O | C | C |
| 74 | C | C | O/C[6] | O/C[3] |
| 76 | C | C | C | C/O[4] |
| 78 | C/O[7] | C/O[7] | C/O[7] | C/O[7] |

[1] Open during adsorption and closed during recycle feed pressurization
[2] Closed during adsorption and open during recycle feed pressurization
[3] Open during adsorption and closed during recycle
[4] Closed during adsorption and open during recycle
[5] Closed during helium pressurization and open during recycle feed pressurization
[6] Open during helium pressurization and closed during recycle feed pressurization
[7] Closed during the first part of depressurization.

Figure 4:
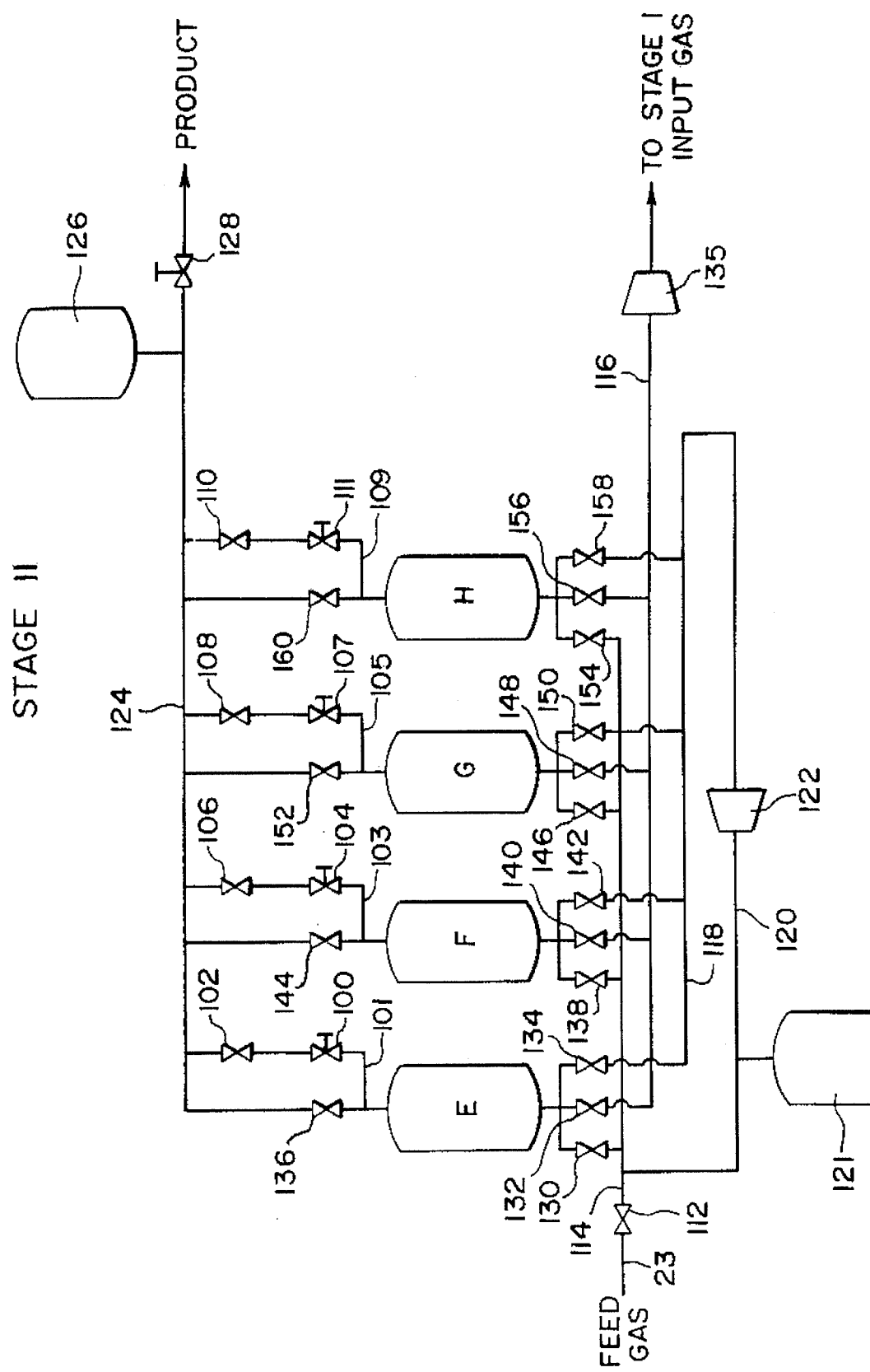
FIG. 4 is a detailed schematic diagram of the second stage pressure swing adsorption system.

The helium enriched gas from stage I is fed as the feed gas to the stage II pressure swing adsorption system as shown in FIG. 4. This feed gas flows from conduit 23 of stage I through valve 112 and into conduit 114. With adsorbent bed E on a phase I adsorption phase, outlet valve 136 is open as is inlet valve 130. Valve 102 is closed. Valves 132 and 134 of adsorbent bed E are closed, as are inlet valves 138, 146 and 154 to adsorbent beds F, G and H respectively. The feed gas flows into adsorbent bed E as also does a recycle gas from adsorbent bed H which is on a phase II depressurization phase. Optionally some of the recycle gas can be stored in tank 121. This depressurization phase recycle gas flows through conduit 118 to compressor 122 where its pressure is increased up to about that of the feed gas or higher. A purified helium product flows through valve 136 and through conduit 124 to a product outlet with some purified helium held in storage tank 126. Throttle valve 128 regulates the pressure in conduit 124 and tank 126. Part of this purified helium will be used in the purge phase and in the phase V helium pressurization phase. The remainder is product gas.

While adsorbent bed E has been on a phase I adsorption phase, adsorbent bed H has been on a phase II depressurization phase. In this phase, outlet valves 160 and 110 are closed, as are inlet valves 154 and 156. The depressurization recycle gas flows through valve 158 and conduit 118 to compressor 122. Pressurized to about feed gas pressure or higher, the recycle gas flows through conduit 120 to conduit 114. In this part of the sequence, this recycle gas will be fed to adsorbent bed E.

Concurrently adsorbent bed G is on a phase III evacuation phase and a phase IV purge phase. In the evacuation phase outlet valves 152 and 108 are closed as are inlet valves 146 and 150. A vacuum is drawn on conduit 116 by vacuum pump 135. This decreases the pressure in adsorbent bed G to more than about 20 inches of Hg vacuum and preferably to more than about 28 inches of Hg vacuum, which substantially removes all of the more highly adsorbed gases from this adsorbent bed G. For the phase IV helium purge phase which takes place at the end of the evacuation phase, valve 108 is opened to allow purified helium to enter adsorbent bed G and to flow countercurrently down into adsorbent bed G. Valve 148 remains open and adsorbent bed G is under a vacuum. This serves to remove the more highly adsorbed gases from the void space and the adsorbent in adsorbent bed G. The gases flowing from adsorbent bed G are flowed to the input to stage I as a part of the stage I input gas.

Additionally, concurrently adsorbent bed F has been in repressurization. This first consists of a phase V helium pressurization phase. In this phase inlet valves 138, 140 and 142 are closed. Outlet valve 144 is open so that purified helium gas which is at a pressure about that of the feed gas flows countercurrently into adsorbent bed F to increase the pressure of adsorbent bed F to about that of the feed gas. Valve 106 is closed.

A preferred option is to also incorporate a feed gas pressurization into the sequence. This entails the closing of valve 144 about half to three fourths of the time through the helium pressurization phase, and preferably about two thirds of the time, and opening valve 138. This permits a repressurization to full feed gas pressure by the use of feed gas prior to valve 144 being opened and an adsorption phase initiated. When this adsorbent bed enters an adsorption phase it only will be necessary to open valve 144.

Valves 100, 104, 107 and 111 are throttle valves which are open through all phase sequences. These valves are interconnected to line 124 and the adsorbent bed exits via conduits 101, 103, 105 and 109 respectively. The flow of helium gas as a purge gas is controlled by the respective companion valve to each of these throttle valves.

This completes an operating sequence for the stage II pressure swing system. Each of the adsorbent beds sequentially goes through each of the phases. This sequence versus time is set out in FIG. 6. This is shown for a 360 second cycle which is a preferred timing. However, as with stage I, the timing is dependent on feed gas composition, feed gas pressure and flow rate and on the adsorbent bed size. In this stage each adsorbent bed contains about 1600 pounds of adsorbent.

Figure 2:
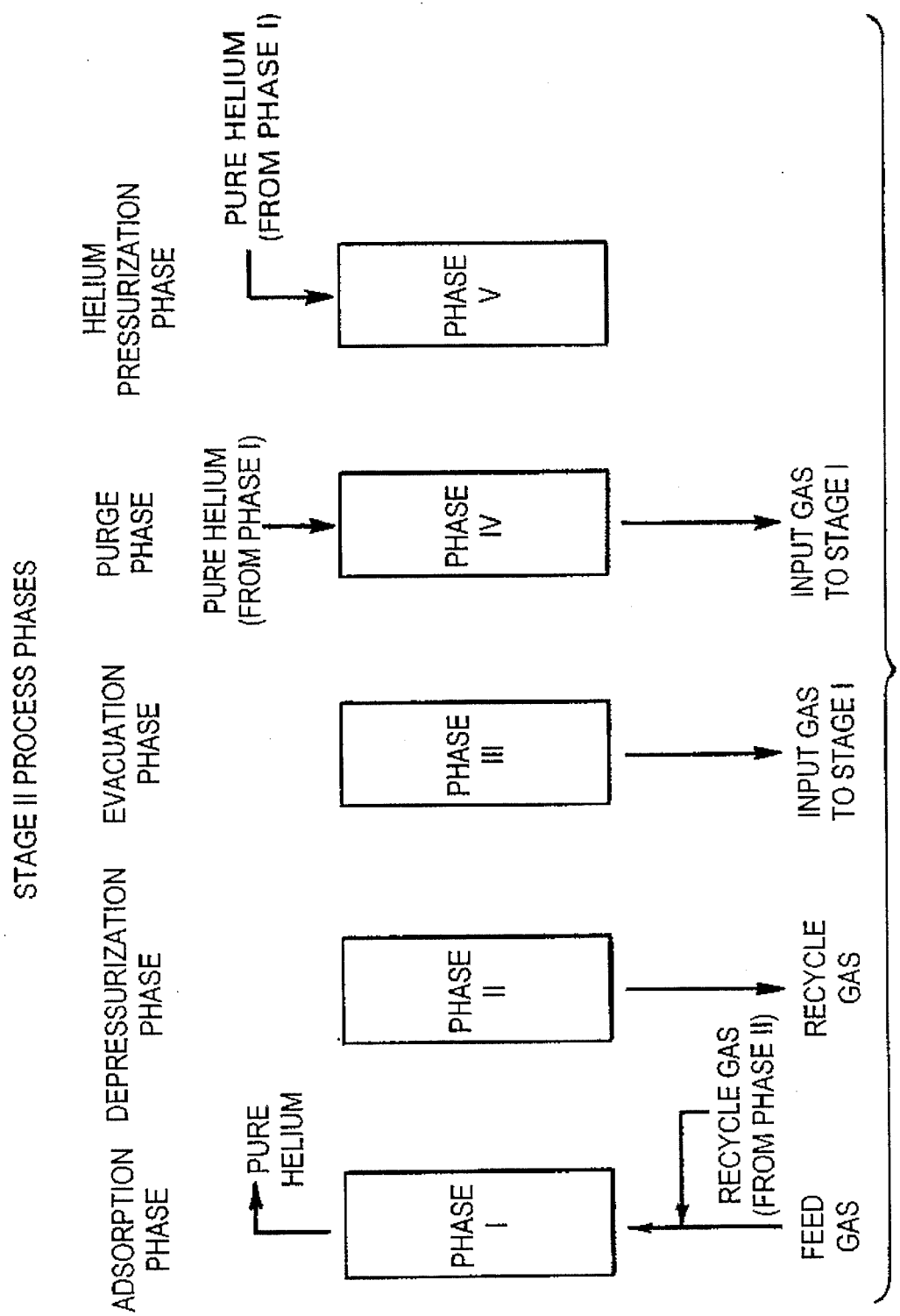
FIG. 2 is a schematic diagram of the pressure swing adsorption phases of the second stage of the helium recovery process.

Table 2 describes the position of each valve during a cycle of FIG. 6 using the pressure swing adsorption system of FIG. 4 and the phase sequence of FIG. 2.

TABLE 2

| Valve # | 0–90 sec. | 90–180 sec. | 180–270 sec. | 270–360 sec. |
|---|---|---|---|---|
| 102 | C | C | C/O$^{(1)}$ | O/C$^{(3)}$ |
| 106 | C | C/O$^{(1)}$ | O/C$^{(3)}$ | C |
| 108 | C/O$^{(1)}$ | O/C$^{(3)}$ | C | C |
| 110 | C/O$^{(1)}$ | O/C$^{(3)}$ | C | C/O$^{(1)}$ |
| 130 | O | C | C | C/O$^{(2)}$ |
| 132 | C | C | O | C |
| 134 | C | O | C | C |
| 136 | O | C | C | O/C$^{(3)}$ |
| 138 | C/O$^{(2)}$ | O | C | C |
| 140 | C | C | C | O |
| 142 | C | C | O | C |
| 144 | O/C$^{(3)}$ | O | C | C |
| 146 | C | C/O$^{(2)}$ | O | C |
| 148 | O | C | C | C |
| 150 | C | C | C | O |
| 152 | C | O/C$^{(3)}$ | O | C |
| 154 | C | C | C/O$^{(2)}$ | O |
| 156 | C | O | C | C |
| 158 | O | C | C | C |
| 160 | C | C | O/C$^{(3)}$ | O |

$^{(1)}$Closed during evacuation and open during purge
$^{(2)}$Closed during helium pressurization and open during an optional feed gas pressurization of 15 seconds
$^{(3)}$Open during helium pressurization and closed during an optional feed gas pressurization This valve position sequence is for a preferred operation of the present process as is the phase and cycle timing. The valve position sequence and the phase and cycle timing can be modified and yet remain within the scope of the present processes.

The two position valve that are used are valves which are either open or closed usually are butterfly valves. Valves 28, 51 and 128 are throttle valves that remain open in a constricted condition. Value 53 is a one-way valve with the arrow showing the flow direction.

The combined stage I and stage II pressure swing systems will produce a helium gas product of more than about 90 percent by volume helium, and preferably more than about 98 percent by volume helium. The pressure swing system can be fully automated with a central processor controlling all of the flows and valve sequencing. The valves are rated for the pressures of the systems. The tanks and conduits likewise must be rated for the operating pressures.

This description sets out the preferred operation of the stage I and stage II pressure swing systems to produce a highly enriched product. The full scope of the invention is more particularly set out and described in the appended claims.

As noted above the first stage of pressure swing adsorption or the second stage of pressure swing adsorption can be used alone. There is no requirement to use both together. The first stage will produce a helium product stream of more than about 75 percent by volume and preferably more than about 90 percent from a gas stream of less than about 10 percent by volume. Such a helium product can be used in balloons and dirigibles. The second stage of pressure swing adsorption can be used in combination with a cryogenic process, a membrane or other process which produces a helium stream of about 50 percent by volume or more helium. The second stage of pressure swing adsorption will bring this helium stream up to a helium content of 90 percent by volume or more and preferably 98 percent by volume or more.

A factor in the increased efficiency of the present pressure swing adsorption processes is the inventory of gas that is maintained within each of pressure swing adsorption stage. The only gases that are discharged from stage I is the product enriched helium gas and the adsorbed gases which primarily are hydrocarbons and nitrogen. These will contain trace amounts at most of helium. In stage I the only non-product gas that leaves the system is the gas from the evacuation phase which is only adsorbed gases and has essentially no helium content and the depressurization gas that has essentially no helium content. The effluent gas from the recycle phase flows to a recycle feed pressurization phase. The gas in the first stage of pressure swing adsorption functions as an inventory gas until it is essentially devoid of helium and then is vented, flared or recovered.

The second stage of pressure swing adsorption likewise maintains a high inventory of gas. When used in combination with the first stage of pressure swing adsorption the gas from the evacuation phase and from the helium purge phase is flowed to the input gas to stage I pressure swing adsorption. In this way no helium leaves the system. A high inventory of gas is maintained in stage II through the flow of all of the depressurization gas into the adsorbent bed in an adsorption phase.

The preferred embodiments of the present helium enrichment processes have been disclosed in this specification. However various modifications can be made to the processes and yet comprise the present concepts. Such modifications are considered to be within the present discoveries.

EXAMPLE

Figure 3:
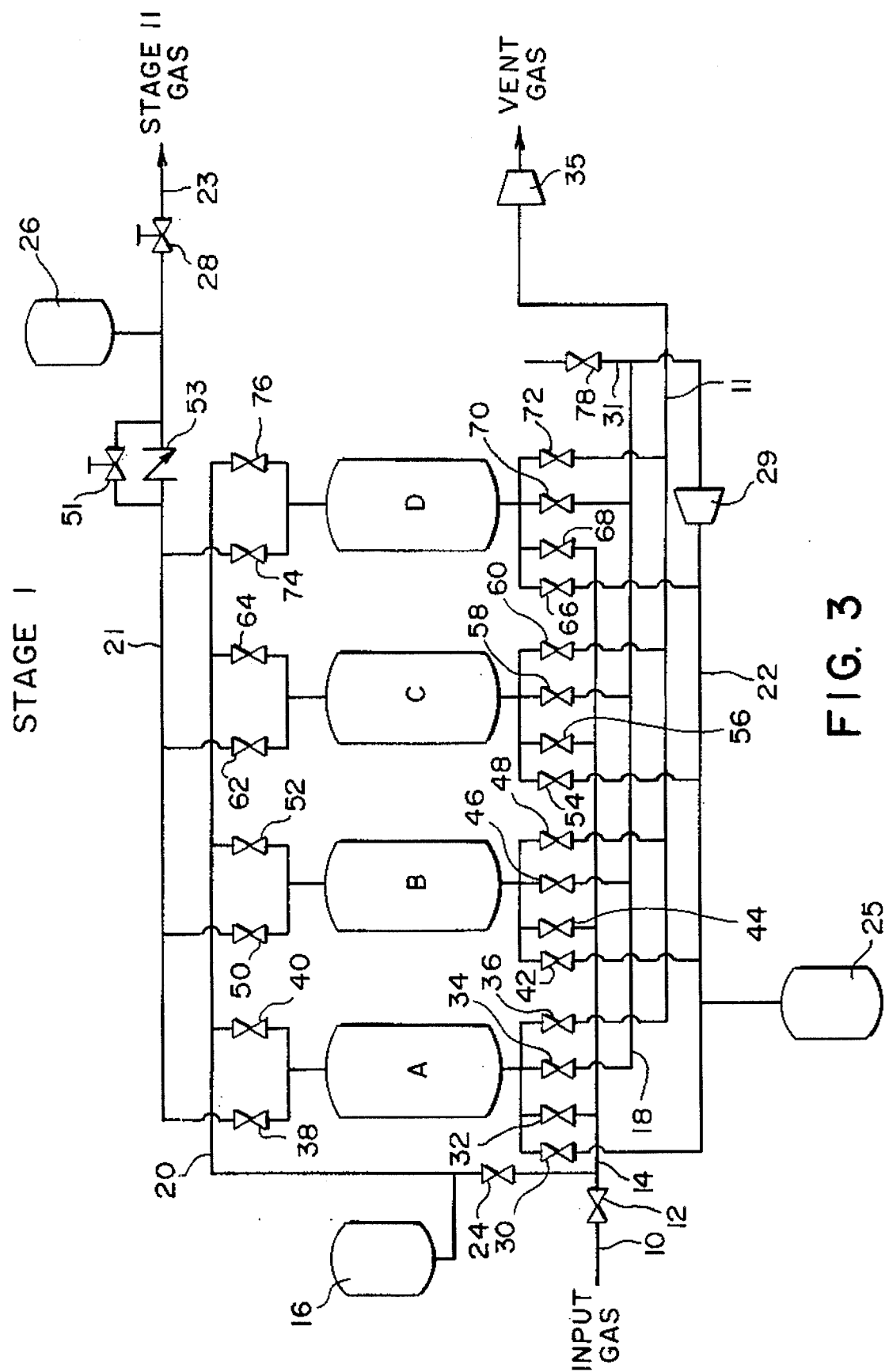
FIG. 3 is a detailed schematic diagram of the first stage pressure swing adsorption system.

An input gas containing 4 percent helium, 26 percent hydrocarbons and 70 percent nitrogen is flowed to a two stage pressure swing adsorption plant which consists of four adsorbent beds as shown in FIGS. 3 and 4. Each adsorbent bed in stage I contains 11 cubic meters of an activated carbon adsorbent and each adsorbent bed in stage II contains 1 cubic meter of activated carbon adsorbent. The input gas is fed at a pressure of 50 psia and a flow rate of 2100 scfm to the stage I adsorbent beds. The phases of stage I is as set out in FIG. 5 and the phases of stage II are set out in FIG. 6. The valves are on a time cycle as described in Table 1 for stage 1 and Table 2 for stage II. An enriched helium gas stream having a helium gas content of 90 percent helium flows through conduit 23 at 127 scfm to stage II. This enriched helium gas is further purified in stage II to a product helium gas having a helium content of 99.999 percent helium. This is produced at a flow rate of 80 scfm.

The gas from the adsorbent bed in the stage II evacuation phase and the gas from the stage II purge phase is recycled to the input gas to stage I. This gas has a helium content of 73 percent and flows at a rate of 47 scfm.

The process is operated continuously until a general maintenance is required.

What is claimed is:

1. A method for the separation of helium from an input gas stream containing helium and other gases by selectively adsorbing said other gases comprising feeding said input gas stream at a pressure to an input to a first stage of a first stage and a second stage of pressure swing adsorption, each stage containing a plurality of interconnected adsorbent beds containing at least one adsorbent, the first stage of pressure swing adsorption concentrating the helium in said gas stream to greater than about 75 percent helium by volume and in said second stage of pressure swing adsorption concentrating said gas stream to greater than about 95 percent helium by volume, feeding a depressurization gas from a depressurization of an adsorbent bed in said first stage to an adsorbent bed of said first stage through which the flow of input gas has ceased and recovering a recycle feed gas therefrom, and flowing said recycle feed gas to an adsorbent bed of said first stage that is to be fed said input gas to at least partially repressurize said adsorbent bed.

2. A method for the separation of helium as in claim 1 wherein in said first stage of pressure swing adsorption there are six phases, each interconnected adsorbent bed undergoing said six phases for each complete cycle, said six phases comprising in sequence an adsorption phase, a recycle phase, a depressurization phase, an evacuation phase, a helium pressurization phase and a recycle feed pressurization phase, a portion of an effluent gas from an adsorbent bed on said depressurization phase being pressurized to about the pressure of said input gas to said adsorption phase and being flowed to an adsorbent bed on said recycle phase with an effluent first stage recycle feed gas enriched in helium flowing therefrom, said effluent first stage recycle feed gas being flowed to an adsorbent bed that is to enter said adsorption phase to pressurize said adsorbent bed to about the input gas pressure of the first stage of pressure swing adsorption.

3. A method for the separation of helium as in claim 2 wherein there are at least four adsorbent beds, feeding said input gas stream to the input end of a first adsorbent bed of said first stage entering on said adsorption phase and selectively adsorbing said other gases, collecting a gas enriched in helium flowing from said first adsorbent bed of said first stage and flowing a portion thereof to said second stage of pressure swing adsorption and a portion thereof to a second adsorbent bed of said first stage that has completed said evacuation phase and that has entered said helium pressurization phase, concurrently depressurizing a fourth adsorbent bed of said first stage and collecting said effluent first stage recycle gas, pressurizing said effluent first stage recycle gas to about the pressure of said input gas stream and flowing a pressurized effluent first stage recycle gas to said first adsorbent bed of said first stage upon the completion of said adsorption phase and the initiation of said recycle phase, flowing the effluent from said first adsorbent bed of said first stage during said recycle phase to said second adsorbent bed of said first stage upon the completion of said helium pressurization phase and that is to enter said adsorption phase to pressurize said second adsorbent bed of said first stage to about the input gas stream pressure, and concurrently evacuating a third adsorbent bed of said first stage that has completed said depressurization phase to remove said other gases therefrom.

4. A method for the separation of helium as in claim 3 wherein said second adsorbent bed of said first stage is further pressurized with input gas prior to entering said adsorption phase.

5. A method for the separation of helium as in claim 2 wherein the adsorbent within each of said adsorbent beds is an activated carbon.

6. A method for the separation of helium as in claim 1 wherein in said second stage of pressure swing adsorption there are five phases, each interconnected adsorbent bed undergoing said five phases for each complete cycle said five phases comprising in sequence an adsorption phase, a depressurization phase, an evacuation phase, a purge phase and a helium pressurization phase, flowing a feed gas enriched in helium from said first stage to an adsorbent bed in said second stage undergoing said adsorption phase with a further enriched helium gas effluent flowing therefrom, flowing a first portion of said further enriched helium gas to purge at least some other gases from an other adsorbent bed in said purge phase, flowing a second portion of said enriched helium gas to a further adsorbent bed that has completed said purge phase and which is to enter said adsorption phase to pressurize this adsorbent bed, and flowing a third portion of said further enriched helium to product.

7. A method for the separation of helium as in claim 6 wherein there are at least four adsorbent beds, feeding said gas from said first stage as said feed gas to a first adsorbent bed in said second stage and collecting three portions of a further enriched helium gas therefrom, concurrently depressurizing a fourth adsorbent bed of said second stage which has completed the production of said further enriched helium and which contains substantial amounts of said other gases, recovering an effluent second stage recycle gas from said fourth adsorbent bed of said second stage and pressurizing said second stage recycle gas to about the pressure of said feed gas to said second stage and flowing said second stage recycle gas to said first adsorbent bed of said second stage, concurrently reducing the pressure in a third adsorbent bed of said second stage to less than about ambient pressure in said evacuation phase and removing a portion of said other gases therefrom, concurrently flowing a first portion of further enriched helium from said first adsorbent bed of said second stage to said third adsorbent bed of said second stage which has completed said evacuation phase as purge gas and further removing said other gases therefrom, and concurrently flowing a second portion of said further enriched helium to a second adsorbent bed of said second stage to increase the pressure within said second adsorbent bed of said second stage.

8. A method for the separation of helium as in claim 6 wherein the adsorbent within each of said adsorbent beds is an activated carbon.

9. A method for the separation of helium from an input gas containing helium and other gases by selectively adsorbing said other gases comprising feeding said input gas to a plurality of interconnected adsorbent beds in a pressure swing adsorption system with each adsorbent bed containing at least one adsorbent, each interconnected adsorbent bed undergoing six phases for each complete cycle, said six phases comprising in sequence an adsorption phase, a recycle phase, a depressurization phase, an evacuation phase, a helium pressurization phase and a recycle feed pressurization phase wherein a portion of an effluent gas from an adsorbent bed being reduced in pressure in said depressurization phase is pressurized to about the pressure of said input gas to said adsorbent bed on said adsorption phase and is flowed to an adsorbent bed on said recycle phase with an effluent recycle feed gas enriched in helium flowing therefrom, said effluent recycle feed gas being flowed to an adsorbent bed that is to enter said adsorption phase to pressurize said adsorbent bed to about the pressure of the input gas to said adsorption phase.

10. A method for the separation of helium as in claim 9 comprising feeding said input gas to a first adsorbent bed with an enriched helium gas stream flowing therefrom, flowing a portion of said enriched helium gas stream as a pressurization gas to a second adsorbent bed to increase the pressure in said second adsorbent bed, concurrently depressurizing a fourth adsorbent bed from an elevated pressure and recovering a first gas as a depressurization gas and a second gas, increasing the pressure of said depressurization gas and flowing said depressurization gas to said first adsorbent bed upon the completion of feeding said input gas stream thereto to produce said effluent recycle feed gas, flowing said effluent recycle feed gas to said second adsorbent bed after the flow of helium enriched gas from said first adsorbent bed to pressurize said second adsorbent bed to further increase the pressure in said second adsorbent bed, and concurrently reducing the pressure in a third adsorbent bed to less than ambient to remove said adsorbed other gases therefrom.

11. A method for the separation of helium as in claim 10 wherein said third and fourth adsorbent beds are depressurized countercurrently with said first gas flowed cocurrently into said first adsorbent bed.

12. A method for the separation of helium as in claim 10 wherein said second adsorbent bed is further pressurized with said input gas prior to entering said adsorption phase.

13. A method for the separation of helium as in claim 10 wherein each adsorbent bed contains an activated carbon adsorbent.

14. A method for the separation of helium from a feed gas containing helium and other gases by selectively adsorbing said other gases comprising flowing said feed gas sequentially to a plurality of interconnected adsorbent beds containing at least one adsorbent in a pressure swing adsorption system, each interconnected adsorbent bed undergoing five phases for each complete cycle, said five phases comprising in sequence an adsorption phase, a depressurization phase, an evacuation phase, a purge phase and a helium pressurization phase, flowing said feed gas along with an effluent recycle gas from the depressurization of an adsorbent bed on said depressurization phase to an adsorbent bed undergoing an adsorption phase with an enriched helium gas effluent flowing therefrom, flowing a first portion of said enriched helium gas to purge other gases from an adsorbent bed that has completed said evacuation phase and that is in said purge phase, flowing a second portion of said enriched helium gas to an adsorbent bed that has completed said purge phase and which is to enter said absorbent phase, and flowing a third portion of said enriched helium to product.

15. A method for the separation of helium as in claim 14 comprising feeding said feed gas to the inlet of a first adsorbent bed with said enriched helium gas flowing therefrom, flowing said first portion of said enriched helium gas to a third adsorbent bed to purge said other gases from said third adsorbent bed when said third adsorbent bed is at a pressure less than about ambient, flowing said second portion of said enriched helium gas to a second adsorbent bed to pressurize said second adsorbent bed, concurrently depressurizing a fourth adsorbent bed and flowing said effluent recycle gas therefrom to said first adsorbent bed as additional feed gas, and concurrently decreasing the pressure in said third adsorbent bed to less than about ambient and flowing a gas enriched in other gases therefrom.

16. A method for the separation of helium as in claim 15 wherein the flow of gas from said fourth adsorbent bed and said third adsorbent bed is countercurrent.

17. A method for the separation of helium as in claim 15 wherein said second adsorbent bed is further pressurized with said feed gas.

18. A method for the separation of helium as in claim 14 wherein the adsorbent in each of said adsorbent beds is an activated carbon adsorbent.

19. A method for the separation of helium from an input gas stream containing helium and other gases by selectively adsorbing said other gases in a first stage of pressure swing adsorption, said first stage consisting of at least four interconnected adsorbent beds, each adsorbent bed containing at least one adsorbent and undergoing six phases for each complete cycle of pressure swing adsorption, said six phases comprising in sequence an adsorption phase, a recycle phase, a depressurization phase, an evacuation phase, a helium pressurization phase and a recycle feed pressurization phase, feeding said input gas stream at a pressure to the input end of a first adsorbent bed of said first stage entering on said adsorption phase and selectively adsorbing said other gases, collecting a gas enriched in helium flowing from said first adsorbent bed of said first stage and flowing a portion thereof to a second adsorbent bed of said first stage that has completed said evacuation phase and that has entered said helium pressurization phase, concurrently depressurizing a fourth adsorbent bed of said first stage and collecting an effluent first stage recycle gas, pressurizing said effluent first stage recycle gas to about the pressure of said input gas stream and flowing a pressurized effluent first stage recycle gas to said first adsorbent bed of said first stage upon the completion of said adsorption phase and the initiation of said recycle phase, flowing the effluent from said first adsorbent bed of said first stage during said recycle phase to said second adsorbent bed of said first stage upon the completion of said helium pressurization phase and that is to enter said adsorption phase to pressurize said second adsorbent bed of said first stage to about the pressure of said input gas, concurrently evacuating a third adsorbent bed of said first stage that has completed said depressurization phase to remove said other gases therefrom, flowing another portion of said gas enriched in helium to a second stage of pressure swing adsorption which consists of at least four interconnected adsorbent beds containing at least one adsorbent, each such adsorbent bed undergoing five phases for each complete cycle of pressure swing adsorption, said five phases comprising in sequence an adsorption phase, a depressurization phase, an evacuation phase, a purge phase and a helium pressurization phase, feeding said enriched helium gas from said first stage at a pressure as a feed gas to a first adsorbent bed in said second stage and collecting three portions of a further enriched helium gas therefrom, concurrently depressurizing a fourth adsorbent bed of said second stage which has completed the production of said further enriched helium gas and which contains substantial amounts of said other gases, recovering an effluent second stage recycle gas from said fourth adsorbent bed of said second stage and pressurizing said effluent second stage recycle gas to about the pressure of said feed gas to said second stage and flowing said effluent second stage recycle gas to said first adsorbent bed of said second stage, concurrently reducing the pressure in a third adsorbent bed of said second stage to less than about ambient pressure and removing a portion of said other gases therefrom, concurrently flowing a first portion of further enriched helium from said first adsorbent bed of said second stage to said third adsorbent bed of said second stage which has completed said evacuation phase as a purge gas and further removing said other gases therefrom, concurrently flowing a second portion of said further enriched helium to a second adsorbent bed of said second stage to increase the pressure within such adsorbent bed, and flowing said other gases from said third adsorbent bed of said second stage to said first adsorbent bed in said first stage.

20. A method for the separation of helium as in claim 19 wherein the adsorbent in each adsorbent bed is an activated carbon adsorbent.

* * * * *